W. J. BALDWIN.
PROCESS FOR THE SEPARATION OF DUST PARTICLES AND SMOKE FROM AIR AND GASES.
APPLICATION FILED APR. 20, 1916.
1,218,354.
Patented Mar. 6, 1917.
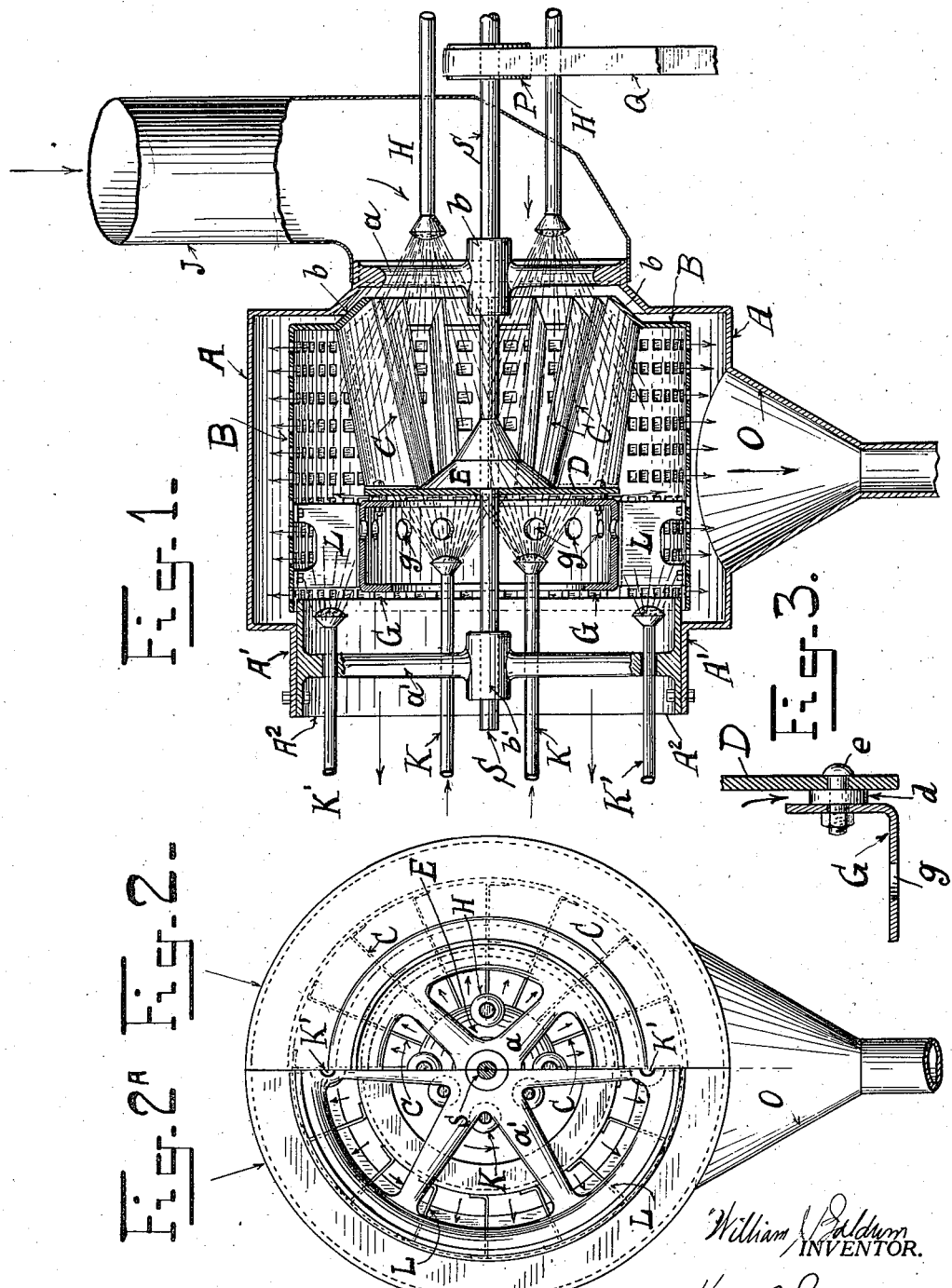

UNITED STATES PATENT OFFICE.

WILLIAM J. BALDWIN, OF BROOKLYN, NEW YORK.

PROCESS FOR THE SEPARATION OF DUST PARTICLES AND SMOKE FROM AIR AND GASES.

1,218,354. Specification of Letters Patent. Patented Mar. 6, 1917.

Application filed April 20, 1916. Serial No. 92,443.

*To all whom it may concern:*

Be it known that I, WILLIAM J. BALDWIN, a citizen of the United States, and a resident of the borough of Brooklyn, in the county of Kings and State of New York, have invented certain new and useful Improvements in Processes for the Separation of Dust Particles and Smoke from Air and Gases, of which the following is a specification.

This invention relates to improvements in processes for the separation of dust particles and smoke from air and gases.

By "dust particles" are meant all matters, in a fine, or comparatively fine state of division, which are diffused through or mingled with the air or gas, and whether said particles are injurious or beneficial, valueless or possessing value, the invention, in this respect relating to the separation of all finely or comparatively finely divided solid matters and smoke and fumes from gases, including atmospheric air, as well as other gases. The invention is also useful for the separation of different gases from each other, and the description and claims hereinafter contained are to be understood as including such use of the invention.

In particular, this invention relates to processes for removing dust particles from gases, and which processes are characterized by the use of a liquid, or liquids and fluids, preferably water or water saturated with a salt or mixed with another fluid either alkaline or acid, heated to a temperature above that of the atmosphere at the time when said process is being operated, and preferably heated to a temperature approximating or even higher than the boiling point of said liquid or liquids. For I have found that, in the precipitation and removal of dust from air, or of one gas from another, liquids of high temperatures are very much more active than liquids at ordinary temperatures. I have also found that, when the liquids or fluids are heated under pressure so as to have temperatures in excess of that due to the pressure of the atmosphere, a considerable amount of the liquid or fluid flies apart into hot vapor, practically steam, upon the release of the pressure, and that the resulting liquid or fluid and its vapor has a further and greater affinity for seizing on dust particles, or for combining with any substances that the fluid or liquid or the vapor of the fluid or liquid has affinity for.

It is further the fact that, when the liquid or fluid is heated to a point closely approaching the temperature at which it will vaporize, the heat of the liquid or fluid will warm the gas from which it is desirable to separate dust particles or other gases, and the latent heat of condensation further assists the inherent tendency to vaporization of the liquid or fluid at any temperature. This tendency is immensely increased at the higher temperatures, even if the temperature is not carried up to the boiling point of the liquid. This is very apparent in the humidification of air or gases; for at 10° F., in the case of air, the point of saturation is only approximately one grain of water or aqueous vapor to the cubic foot of air, while at 60° F. it is nearly six grains of water or aqueous vapor to the cubic foot of air, at 100° F. it is over nineteen grains of water per cubic foot of air, and at 212° F., it is about two hundred and sixty-five grains of water or aqueous vapor per cubic foot of air.

In consequence of the foregoing facts and principles the intimate contact of the liquid or its vapor with the dust particles or other foreign substance is greatly promoted by heating the liquid; and, in general, the higher the temperature of the water the greater will be its effect in intimately mixing with said "dust particles" and forming agglomerates, which I term "mud." In the operation of my said process, these agglomerates, or mud, are thrown by the centrifugal force due to the rotary motion of the rotor out of the gas and against and through a perforated screen, or basket, which prevents their return and readmixture with the gas; the final result, on account of the very beneficial effect of the heated water, or fluid and its steam or vapor, being a very perfect removal of the dust or other absorbed matter from the gas or air to be treated.

I further promote the perfection of the removal of the dust or foreign matter, by forcing the gas to pass, after the first removal of the dust and mud, through a screen or film of hot water and against streams of hot water which are projected through the gas in a direction opposed to the direction of the flow of the gas or air to be cleaned; thus further promoting a very intimate admixture of the hot water and the dust particles.

I have also found that, by the use of a fluid, as for example, water, heated above its boiling point, a sudden expansion of said fluid and breaking of it up into fine vapor occurs when said fluid issues from its pipes and enters the revolving shell or basket into which the dust-laden gas has been delivered. This sudden breaking up of the fluid or water into fine vapor, greatly promotes the intimate admixture of the water or watery vapor with the dust particles and the efficient removal of such particles from the gas or air.

Referring to the drawings which accompany the specification, to aid the description, and which drawings illustrate a preferred form of apparatus for applying the invention, Figure 1 is a longitudinal vertical section and elevation, partly broken, showing the rotor in its stationary outer case or shell; Fig. 2 and Fig. 2ª being respectively vertical elevations of one side of the front and of the other side of the rear end of the machine. Fig. 3 is a detail showing the construction and the arrangement of certain parts by which the annular slot for producing the said transverse sheet or film of hot water is produced.

A is a stationary outer case or shell constructed of sheet metal and preferably of a substantially cylindrical shape provided at the lower part with a discharge outlet O for the escape of the agglomerates or mud. At the front end of said case A is connected a suitable inlet pipe or channel J, said front end of case A being preferably formed at its central part as a conical frustum connecting with said inlet J as shown. The rear end of said case A is preferably somewhat reduced in diameter, as at A', and contains a spider a' firmly secured to said part A', and carrying the bearing b' for the rotor shaft S, there being a spider a and bearing b similarly arranged at the inlet of said case A as seen in Fig. 1.

In said case A revolves the rotor, which is constructed as follows: On said shaft S is securely fixed a preferably conical hub E, to which is securely fastened a circular disk D, and to the outer parts of said disk, and preferably outside of the periphery of said hub E, are the fan blades C firmly secured by suitable flanges and bolts at their rear ends to said disk D. Said blades C are preferably flared outwardly and forwardly as seen in Fig. 1, and are firmly secured at their front ends to the conical neck b of the rotating shell or basket B. Said basket B has a perforated periphery, being constructed of perforated sheet metal or any suitable wire mesh as may be desired. Said basket B is further firmly secured and held in its proper position by means of a number of radial wings L, each of which is securely fastened at its outer edge to said basket B and at its inner edge to the concentric drum or cylinder G; said drum or cylinder G being securely bolted by bolts and separating washers, e and d respectively, to said disk D, the construction of these parts being clearly indicated in Fig. 3. Thus there is formed a narrow annular space or slot between said disk D and the end of said cylinder G which, as will be hereinafter set forth, produces a sheet or film of hot fluid or water or hot watery vapor across the path of the gas. The front and rear ends of said cylinder G have wide central openings as shown, said cylinder being practically open ended, and the periphery of said cylinder is perforated with a number of holes g, for the escape of such hot water as having entered said cylinder G does not escape through said slot.

Hot liquid, preferably water, is projected into the front end of said basket B from pipes and nozzles H which are connected with a suitable supply of hot liquid or fluid under pressure. Hot liquid or fluid, preferably water, is projected into the rear end of said cylinder G from pipes and nozzles K, and heated liquid or fluid, preferably water, is also projected into the rear end of said basket B by other pipes K', K' and in a direction opposed to the flow of the gas; all said pipes K', K' being connected with a suitable supply of hot liquid.

I prefer to arrange said basket B so that its rear end slightly overlaps the front end of the tubular outlet A² which carries said spider a' as shown in Fig. 1.

The operation of the process and apparatus is as follows: The gas or air containing the dust or impurities which are to be removed from the gas or air, and which may be the unconsumed carbon, carbonic acid, carbonic oxid and other matters in smoke, or the various solid or semi-solid viscous or other injurious matters in the hot gases of various manufacturing processes, enters the case A through the suitable inlet pipe or channel J, being preferably forced through said pipe or channel by suitable forcing or blowing apparatus. As the gas enters said case A it meets the hot watery vapor which is projected into said case from the nozzles of pipes H, the hot water breaking, as has been herein before stated, into watery vapor which attacks and very finely mixes with the dust, forming agglomerates or precipitates which are revolved very rapidly by the fan blades C and thrown violently in outward radial direction against said basket B, while the gas from which said agglomerates are thrown out, flows in a rearward direction, inside said basket B, toward the gas outlet A', A². Said basket B revolves at the same number of revolutions per minute as said fan blades C, but its peripheral velocity is greater, and this velocity is imparted to said agglomerates or precipitates which are thrown violently out of the basket through its perforated periphery, and into the space between said basket B and case A. Said basket prevents the return and readmixture of the agglomerates with the gas or air, and said agglomerates gradually fall and pass out of said case by the discharge O. The gas freed from said agglomerates and precipitates flows, as said, rearwardly and finally out through the outlet A² for the discharge of gases, which can be connected with any suitable chimney or any other conduit. As said gas flows rearwardly it meets with and passes through the film or screen of hot watery spray, which is projected, as before stated, from said slot $d$ across the path of flow of said gas, and said watery film attacks any dust that remains in the gas, forming agglomerates which are expelled through openings in said basket B and finally fall through said outlet O. As said gas continues its rearward flow it is again set in rapid tangential rotation by said wings L, and any dust or fumes still remaining in the gas meets watery spray which is being projected out through the orifices $g$ of said cylinder G, and said gas also flows against the watery spray which is being projected in the direction opposite to that of the flow of the gas from said nozzles and pipes K'. By the action of the water issuing from said nozzles K' the air or gas is very intimately mixed with the water vapor, and any dust particles remaining in it are condensed and converted into agglomerates and projected out through suitable openings in said basket by reason of the high rotary velocity imparted to the gas and the agglomerates by said wings L; the final result being a very perfect removal from the air or gas of the objectionable particles, and a correspondingly perfect separation of the air or gas from the dust.

It is to be noted that the outer case or shell A may be of any size, and even relatively large as a room in which said rotor is situated; and that the effect of such outer casing or chamber is to produce such gaseous pressure outside of the perforated peripheral wall of the rotor, when said rotor is revolving, as will practically balance the gaseous pressure inside of said wall, and which therefore prevents any undesirable quantity of gas from flowing outward through the perforations in said wall. Whenever, therefore, in the specification or claims an external case, casing, chamber or space is referred to, such terms are to be understood as including a chamber or casing of large size as a room, as well as a casing of smaller size, as in the usual significance of the terms. Said rotor will of course be revolved at proper high speeds in any suitable manner, as by pulley P and belt Q from any suitable prime mover, the speed of the rotor being adapted to the particular kinds of dust and gas which are operated on.

The words "dust" or "dust particles" as herein used are understood to apply to anything in the air or gas that is to be separated from said air or gas, such, for example, as smoke or its constituents, cinders, tar, ammonia, fine particles of carbon, carbonic acid, sulfuric acid, the chlorids and sulfids and metals and minerals in the gaseous or dust form. The words "gas" or "air" are understood to apply to atmospheric air or other gases from which dust particles are to be separated.

Now having described my improvements I claim as my invention—

1. The process of removing dust from gas, which consists in revolving the gas containing the dust and projecting into the gas while so revolving liquid heated under pressure above the boiling point of the liquid at the pressure of said gas, so that a part of said liquid explodes into vapor on entering said gas breaking up and agglomerating the dust and the remainder of the liquid washes said agglomerates from the surfaces to which they adhere, substantially as described.

2. The process of removing dust from gas, which consists in revolving the gas containing the dust and projecting into the gas while so revolving liquid heated under pressure above its boiling point at the pressure of the gas so that when said liquid enters said gas a part of said liquid explodes into vapor breaking up and then agglomerating the dust and the remainder of the liquid washes said agglomerates from the surfaces to which they have adhered, and finally projecting the agglomerates which have separated from the gas in one direction and the gas from which said agglomerates have been separated in another direction, substantially as described.

3. The process of removing dust from gas consisting in revolving a body of gas containing dust within a rotary screen, projecting into said gas while it is revolving liquid heated under pressure above the boiling point of the liquid at the pressure of said gas, whereby a part of said liquid explodes in said gas comminuting and then agglomerating said dust and the remainder of said liquid washes said agglomerates from the machine surfaces to which they have adhered, projecting films of liquid against the flow of the gas from which the dust has been separated to further wash the gas, and finally removing the purified gas from the machine in one direction and the agglomerates in another direction whereby their readmixture is prevented, substantially as described.

Signed at New York city, in the county of New York, and State of New York, this 17th day of April, A. D. 1916.

WILLIAM J. BALDWIN.

Witnesses:
WALTER N. HARRIS,
WILLIAM PATTERSON.